(12) United States Patent
Huang

(10) Patent No.: US 7,974,481 B2
(45) Date of Patent: Jul. 5, 2011

(54) METHOD AND APPARATUS FOR COST CALCULATION IN DECIMAL MOTION ESTIMATION

(75) Inventor: Chao-Tsung Huang, Kaohsiung (TW)

(73) Assignee: Novatek Microelectronics Corp., Hsinchu (TW)

( * ) Notice: Subject to any disclaimer, the term of this patent is extended or adjusted under 35 U.S.C. 154(b) by 1643 days.

(21) Appl. No.: 11/163,932

(22) Filed: Nov. 4, 2005

(65) Prior Publication Data

US 2007/0019738 A1    Jan. 25, 2007

(30) Foreign Application Priority Data

Jul. 20, 2005   (TW) .............................. 94124455 A

(51) Int. Cl.
*G06K 9/36* (2006.01)
(52) U.S. Cl. .................... 382/236; 375/240.17
(58) Field of Classification Search ................. 382/236; 375/240.16, 240.17
See application file for complete search history.

(56) References Cited

U.S. PATENT DOCUMENTS

| 5,623,313 | A | 4/1997 | Naveen .......................... 348/416 |
| 5,694,179 | A | 12/1997 | Kwak et al. .................... 348/699 |
| 6,122,318 | A * | 9/2000 | Yamaguchi et al. .......... 375/240 |
| 6,968,008 | B1 * | 11/2005 | Ribas-Corbera et al. ........................ 375/240.16 |
| 7,580,456 | B2 * | 8/2009 | Li et al. .......................... 375/240 |
| 2005/0062886 | A1 * | 3/2005 | Hoshino et al. ............... 348/459 |
| 2005/0105617 | A1 * | 5/2005 | Chono ..................... 375/240.16 |

* cited by examiner

*Primary Examiner* — Matthew C Bella
*Assistant Examiner* — Dennis Rosario
(74) *Attorney, Agent, or Firm* — Jianq Chyun IP Office

(57) ABSTRACT

A method and an apparatus for cost calculation in decimal motion estimation are provided. The method comprises the following steps. Firstly, perform interpolation on a current block to get an interpolation result of a position corresponding to a decimal motion vector. Secondly, calculate a cost according to data at integer point positions of a reference frame corresponding to the current block and the decimal motion vector, and according to the interpolation result.

8 Claims, 1 Drawing Sheet

US 7,974,481 B2

METHOD AND APPARATUS FOR COST CALCULATION IN DECIMAL MOTION ESTIMATION

CROSS-REFERENCE TO RELATED APPLICATION

This application claims the priority benefit of Taiwan application serial no. 94124455, filed on Jul. 20, 2005. All disclosure of the Taiwan application is incorporated herein by reference.

BACKGROUND OF THE INVENTION

1. Field of the Invention

The present invention relates to a method and an apparatus for cost calculation in motion estimation, and more particularly, to a method for cost calculation in decimal motion estimation and an apparatus thereof.

2. Description of the Related Art

Motion estimation is a significant process in the video compression technique. Its major function is to calculate and compare the costs of motion vectors within a specific range. There are two major methods for decimal motion estimation in the prior art.

Figure 1:
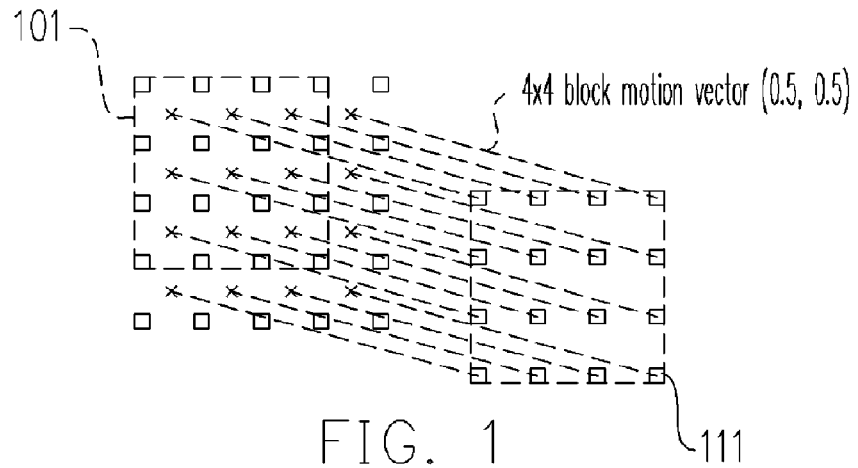

The first method is as shown in FIG. 1. In such method, an interpolation is performed on the reference frame data 101 for obtaining the decimal position data (it is indicated in the diagram by "x"), and a cost is obtained by calculating and comparing the interpolated data with the current block 111. Here, the current block is the block in the current frame. As shown in FIG. 1, the block size is 4×4, and the motion vector is headed towards the bottom-right as (0.5, 0.5). The disadvantages of such method are the interpolation is required and the computing amount is proportional to the number of the decimal motion vectors required to test. If it is desired to further support motion estimation for variable-size block, the interpolation may be required for every variation of block sizes and motion vectors, which significantly increases the computing complexity.

The second method is a method disclosed by U.S. Pat. Nos. 5,623,313 and 5,694,179. The second method uses a cost obtained from an integer point motion vector to estimate a cost of the neighboring decimal motion vector. Such method significantly reduces the computing amount required by the interpolation. However, its major disadvantage is the poor accuracy of the estimated cost, which significantly degrades the compression quality.

As described above, the conventional method cannot provide the low computing amount and the high accuracy cost at the same time. Accordingly, it is one of the objects of the present invention to resolve this problem.

SUMMARY OF THE INVENTION

Therefore, it is an object of the present invention to provide a method for cost calculation in decimal motion estimation. The method significant reduces the computing amount of the interpolation and provides an accurate cost.

It is another object of the present invention to provide an apparatus for cost calculation in decimal motion estimation. The apparatus effectively calculates multiple block sizes and provides a cost of the decimal motion vector with high compression quality and low computing amount.

In order to achieve the objects mentioned above and others, the present invention provides a method for cost calculation in decimal motion estimation. The method comprises following steps. First, an interpolation is performed on the current block, so as to obtain an interpolation result corresponding to the position of the decimal motion vector. Then, a cost is calculated according to the integer point position data of the reference frame that is corresponding to the current block and the decimal motion vector mentioned above and further according to the interpolation result.

In an embodiment of the method for cost calculation in decimal motion estimation mentioned above, the position of the current block corresponding to the decimal motion vector is a position after the integer points of the current block move in the opposite direction of the decimal motion vector mentioned above.

The embodiment of the method for cost calculation in decimal motion estimation mentioned above further comprises following steps: calculating another cost according to the integer point position data of the reference frame that is corresponding to the subblock and another decimal motion vector; and calculating yet another cost according to the interpolation result mentioned above. Wherein, the subblock mentioned above is the subblock in the current block.

According to another aspect of the present invention, the present invention further provides an apparatus for cost calculation in decimal motion estimation. The apparatus comprises an interpolator and a cost calculating unit. Wherein, the interpolator interpolates a current block so as to obtain an interpolation result of the position corresponding to the decimal motion vector. The cost calculating unit calculates a cost according to the integer point position data of the reference frame that is corresponding to the current block and the decimal motion vector and further according to the interpolation result.

In the present invention, the interpolation is performed on the decimal position of the current frame, and the interpolated data is further compared with the reference frame data that is corresponding to the integer point position, so as to obtain a cost of the position. In the present invention, the costs for all of the block sizes can be obtained merely by interpolating the current block. Accordingly, the present invention significantly reduces the computing amount in comparison to the first method of the conventional technique, and the present invention provides more accurate cost estimation in comparison to the second method of the conventional technique.

BRIEF DESCRIPTION DRAWINGS

The accompanying drawings are included to provide a further understanding of the invention, and are incorporated in and constitute a part of this specification. The drawings illustrate embodiments of the invention, and together with the description, serve to explain the principles of the invention.

FIG. 1 schematically shows a method for cost calculation in decimal motion estimation in the conventional technique.

Figure 2:
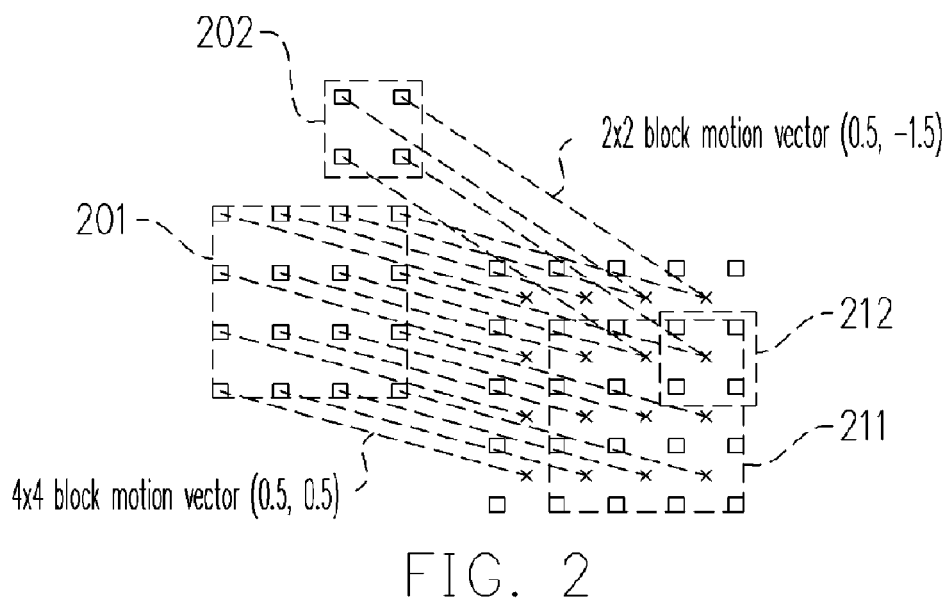

FIG. 2 schematically shows a method for cost calculation in decimal motion estimation according to an embodiment of the present invention.

Figure 3:
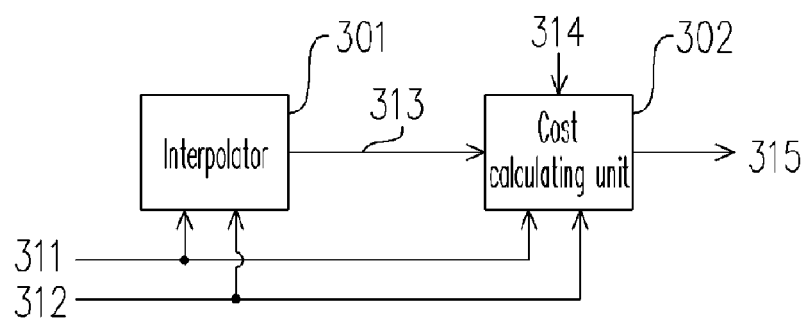

FIG. 3 schematically shows an apparatus for cost calculation in decimal motion estimation according to an embodiment of the present invention.

DESCRIPTION PREFERRED EMBODIMENTS

The method for cost calculation in decimal motion estimation provided by the present invention mainly comprises two steps. First, an interpolation is performed on the current block, so as to obtain an interpolation result corresponding to the position of the decimal motion vector. Then, a cost is calculated according to the integer point position data of the reference frame that is corresponding to the current block and the decimal motion vector mentioned above and further according to the interpolation result. Here, the position of the current block corresponding to the decimal motion vector is the position after the integer points of the current block move in the opposite direction of the decimal motion vector mentioned above. The present invention is described in greater detail with referring to an embodiment shown in FIG. 2 hereinafter.

It is assumed that the embodiment in FIG. 2 is to obtain a cost of the current block 211 having a motion vector headed towards the bottom-right (0.5, 0.5), and the size of the current block 211 is 4×4. First, an interpolation headed towards the top-left (0.5, 0.5) is performed on the current block 211, and the operation result is indicated by the crosses in FIG. 2. Then, the interpolation result is compared with the data 201 of the reference frame having the (0, 0) motion vector, so as to obtain a cost of a motion vector headed towards the bottom-right (0.5, 0.5).

In the interpolation mentioned above, if the sampling range of the interpolation filter exceeds the margin of the current block, the data in the exceeding portion can be provided by two different methods. The first method uses the data of other blocks neighboring to the current block in the current frame as the partial input to the interpolation, so as to obtain the interpolation result. The second method uses the margin value of the current block to fill the portion of the sampling range exceeding the current block margin and uses the portion as a partial input to the interpolation, so as to obtain the interpolation result.

One of the advantages of the present invention is that the interpolation result is reusable. In other words, after the interpolation result of the current block is obtained, a cost of different motion vector of the subblock in the current block can be obtained according to the same batch of the interpolation result. Accordingly, a great amount of the interpolation computation is avoided. For example, as shown in the embodiment of FIG. 2, the 2×2 interpolation result on the top-right corner of the current block 211 is compared with the integer point data 202 of the reference frame, so as to obtain a cost of the (0.5, −1.5) motion vector.

Moreover, the present invention can be easily merged with the conventional reference frame interpolation method as a different type of application. For example, an optimal motion vector with ½ pixel accuracy for all of the block modes with a size more than 8×8 is obtained by using the method for cost calculation provided by the present invention, and an optimal block mode can be further selected. Then, a most accurate motion vector with ¼ pixel accuracy is obtained by using the conventional reference frame interpolation method. Accordingly, the function of fast calculating the cost of the decimal motion vector can be merged, so as to obtain the motion vector with ½ pixel accuracy, and the most accurate motion vector with ¼ pixel accuracy is detected with the most accurate method for cost estimation, such that both of the computation efficiency and the compression quality are sustained.

In addition to the method for cost calculation, the present invention further provides an apparatus for cost calculation in decimal motion estimation. FIG. 3 schematically shows a cost calculating apparatus 300 according to an embodiment of the present invention. In fact, the cost calculating apparatus 300 embodies the method for cost calculation described in the previous embodiment.

The cost calculating apparatus 300 comprises an interpolator 301 and a cost calculating unit 302. Wherein, the interpolator 301 receives the current block 311 and the decimal motion vector 312 and interpolates the current block 311, so as to obtain an interpolation result 313 of the position corresponding to the decimal motion vector 312. In addition, the cost calculating unit 302 receives the current block 311, decimal motion vector 312, the interpolation result 313, and the reference frame data 314, and calculates a cost 315 according to the integer point position data 314 of the reference frame that is corresponding to the current block 311 and the decimal motion vector 312, and the cost 315 is further calculated according to the interpolation result 313.

Same as the previous embodiment, when the interpolator 301 detects that the sampling range of the interpolation exceeds the margin of the current block, the data of other blocks neighboring to the current block can be used as a partial input of the interpolation to obtain the interpolation result 313. Alternatively, the margin value of the current block is used to fill the portion of the sampling range exceeding the current block margin and then the portion is used as a partial input to the interpolation, so as to obtain the interpolation result 313. Moreover, same as the previous embodiment, the interpolation result 313 can be repeatedly used by the cost calculating unit 302 to obtain the cost of different motion vector of the subblock in the current block.

In summary, in the present invention, the interpolation is performed on the decimal position of the current frame, and the interpolated data is further compared with the reference frame data that is corresponding to the integer point position, so as to obtain a cost of the position. In the present invention, the costs for all of the block sizes can be obtained merely by interpolating the current block. Accordingly, the present invention significantly reduces the computing amount in comparison to the first method of the conventional technique, and the present invention provides more accurate cost estimation in comparison to the second method of the conventional technique. In other words, the present invention sustains both of the high computation efficiency and the high compression quality.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A method for cost calculation in decimal motion estimation, comprising:
    (a) performing an interpolation on a current block, so as to obtain an interpolation result of a position corresponding to a decimal motion vector;
    (b) calculating a cost according to an integer point position data of a reference frame corresponding to the current block and the decimal motion vector and according to the interpolation result; and
    (c) calculating another cost according to an integer point position data of the reference frame corresponding to a subblock and another decimal motion vector and according to the interpolation result, wherein the subblock is a subblock in the current block.

2. The method for cost calculation in decimal motion estimation of claim 1, wherein the position of the current block corresponding to the decimal motion vector is a position after integer points of the current block move in the opposite direction of the decimal motion vector.

3. The method for cost calculation in decimal motion estimation of claim 1, wherein the step (a) further comprises:

if a sampling range of the interpolation exceeds a margin of the current block, using the data of other blocks neighboring to the current block as a partial input to the interpolation, so as to obtain the interpolation result.

4. The method for cost calculation in decimal motion estimation of claim 1, wherein the step (a) further comprises:
if a sampling range of the interpolation exceeds a margin of the current block, using a margin value of the current block to fill a portion of the sampling range exceeding the current block margin and using the portion as a partial input to the interpolation, so as to obtain the interpolation result.

5. An apparatus, adapted to a video compression apparatus for cost calculation in decimal motion estimation, the apparatus comprising:
an interpolator for performing an interpolation on a current block, so as to obtain an interpolation result of a position corresponding to a decimal motion vector; and
a cost calculating unit for calculating a cost according to an integer point position data of a reference frame corresponding to the current block and the decimal motion vector and according to the interpolation result, the cost calculating unit further calculating another cost according to an integer point position data of the reference frame corresponding to a subblock and another decimal motion vector and according to the interpolation result, wherein the subblock is a subblock in the current block.

6. The apparatus of claim 5, wherein the position of the current block corresponding to the decimal motion vector is a position after integer points of the current block move in the opposite direction of the decimal motion vector.

7. The apparatus of claim 5, wherein if a sampling range of the interpolation exceeds a margin of the current block, the interpolator uses the data of other blocks neighboring to the current block as a partial input to the interpolation, so as to obtain the interpolation result.

8. The apparatus of claim 5, wherein if a sampling range of the interpolation exceeds a margin of the current block, the interpolator uses a margin value of the current block to fill a portion of the sampling range exceeding the current block margin and uses the portion as a partial input to the interpolation, so as to obtain the interpolation result.

* * * * *